United States Patent [19]

Stookey

[11] Patent Number: 4,671,875
[45] Date of Patent: Jun. 9, 1987

[54] FLUID SEPARATION MODULE

[75] Inventor: Donald J. Stookey, Creve Coeur, Mo.

[73] Assignee: Monsanto Company, St. Louis, Mo.

[21] Appl. No.: 858,761

[22] Filed: May 2, 1986

[51] Int. Cl.$^4$ .............................................. B01D 13/00
[52] U.S. Cl. .............................. 210/321.1; 210/433.2; 210/450
[58] Field of Search .................. 210/321.1, 433.2, 450, 210/350, 500.23

[56] References Cited

U.S. PATENT DOCUMENTS

| | | | |
|---|---|---|---|
| 3,526,001 | 8/1970 | Smith | 210/23 |
| 4,308,654 | 1/1982 | Bogart | 29/451 |
| 4,315,819 | 2/1982 | King et al. | 210/321.3 |
| 4,400,276 | 8/1983 | Bollinger et al. | 210/450 X |

Primary Examiner—Frank Spear
Attorney, Agent, or Firm—H. Croskell

[57] ABSTRACT

A fluid separation module made up of a cylindrical shell having an outlet end and an enlarged inlet end. A bundle of hollow fiber membranes positioned in the shell extend through a cast tube sheet positioned in the enlarged inlet end of the shell. A flexible, imperforate sleeve is positioned in the shell surrounding the bundle of hollow fiber membranes, with one end of the sleeve being secured to the fiber bundle adjacent to the tube sheet and the other end of the sleeve being secured to the inner surface of the cylindrical shell at the enlarged end at the end thereof to leave a retroflexed, intermediate portion of the sleeve extending down the shell between the shell and the bundle of hollow fiber membranes. A fluid entering the inlet end of the shell inflates the flexible sleeve to occupy all free space between the fiber bundle and the shell and thereby force all of the fluid to pass through the bundle of hollow fiber membranes.

6 Claims, 1 Drawing Figure

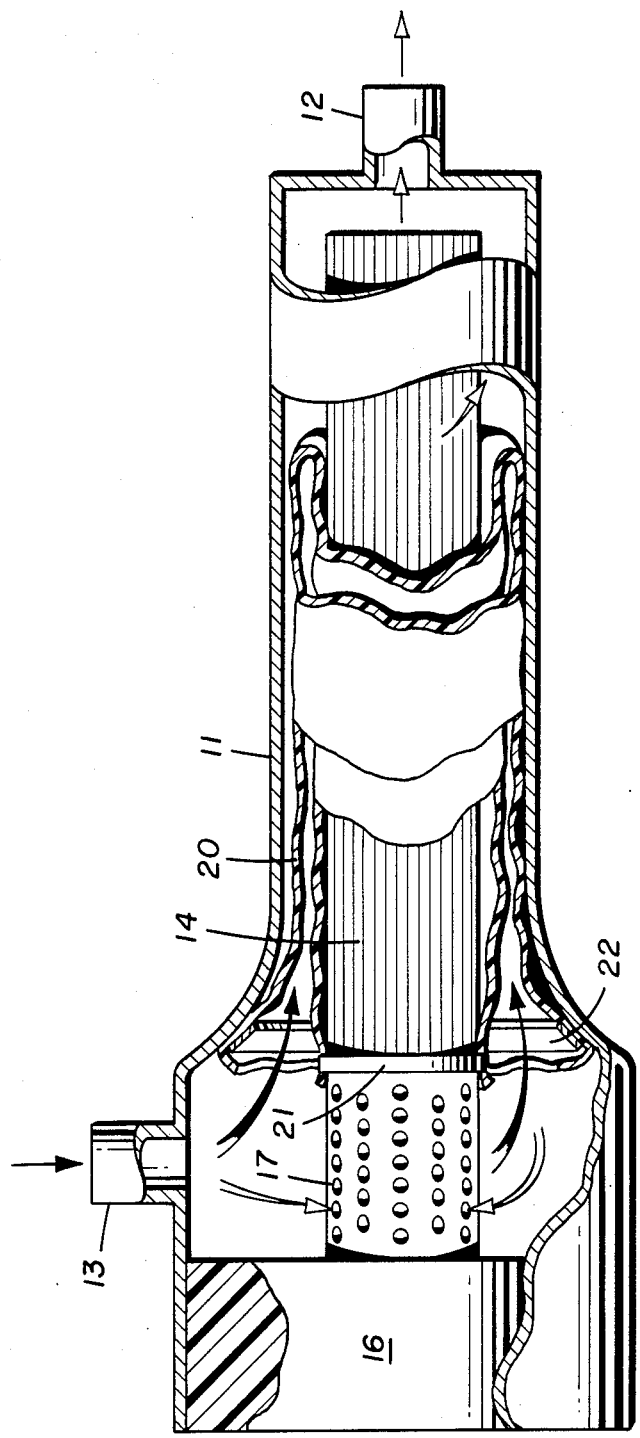

FLUID SEPARATION MODULE

BACKGROUND OF THE INVENTION

A. Field of the Invention

This invention relates to fluid separation modules.

B. Prior Art

It is known to use fluid separation modules made up of a bundle of unconstrained, unsupported hollow fiber membranes positioned in a cylindrical shell. A major disadvantage of this construction is that such a module cannot be used in a horizontal position. The reason is that the fiber bundle will sag to the bottom of the cylindrical shell to leave a free space above the fiber bundle. The fluid mixture to be treated will pass primarily through this free space and will not enter the fiber bundle, such that the separation of one fluid from the mixture is very inefficient. To avoid this problem, such a module must be operated in a vertical position. This renders it much more difficult to remove the fiber bundle for inspection or replacement.

Various attempts have been made to solve this problem. For example, in the module shown in U.S. Pat. No. 4,315,819, the fiber bundle is longitudinally compacted so as to fill the shell. However, results achieved by this approach are still inferior to those obtained when the module is operated in a vertical position.

In the structure disclosed in U.S. Pat. No. 3,526,001, a number of bands encircling the fiber bundle are used in an attempt to break up flow through the fiber bundle.

SUMMARY OF THE INVENTION

A fluid separation module made up of a cylindrical shell having an outlet end and an enlarged inlet end encloses a bundle of hollow fiber membranes extending along the length of the shell and through a cast tube sheet positioned in the inlet end of the shell. An imperforate, flexible sleeve positioned in the shell and surrounding the fiber bundle is secured at one end to the bundle of hollow fiber membranes at a point near the tube sheet, while the other end of the flexible sleeve is secured to the inner surface of the shell at the enlarged inlet end thereof to leave a free, intermediate portion of the sleeve extending down the shell between the shell and the bundle of hollow fiber membranes. When a fluid is admitted to the inlet end of the shell, the flexible sleeve will inflate to fill all free space between the shell and the fiber bundle so as to force all of the fluid to flow through the fiber bundle.

DESCRIPTION OF THE DRAWING

The single FIGURE of the drawing schematically shows a fluid separation module which is provided with an imperforate, flexible sleeve which is inflated by fluid pressure to prevent flow of the fluid around the fiber bundle.

DETAILED DESCRIPTION OF THE INVENTION

Referring now in detail to the drawing, there is shown a cylindrical shell 11 having an outlet 12 at one end thereof and an inlet 13 in the other end of the shell, this end of the shell being enlarged. A bundle 14 of hollow fiber membranes of a known type is positioned in the shell 11 and extends through a tube sheet 16 positioned in the enlarged end of the shell 11. A perforated metal sleeve 17 secured to the tube sheet 16 in the position surrounding the fiber bundle 14 extends from the tube sheet in a direction toward the outlet end 12 of the shell 11. The sleeve 17 is perforated to allow a fluid admitted through the inlet 13 to enter the fiber bundle 14.

An imperforate, flexible sleeve 20 surrounds the fiber bundle 14 and is secured at one end to the perforated sleeve 17 by means of a hose clamp 21. The other end of the sleeve 20 is held by a ring 22 attached to the inner surface of the shell 11 at the enlarged end thereof. This leaves a retroflexed, intermediate portion of the sleeve 20 extending down the shell 11 between the shell and the fiber bundle 14. Preferably, this intermediate portion of the sleeve will extend the length of the fiber bundle. The purpose of the sleeve 20 is to inflate under fluid pressure and fill any free space between the inner surface of the shell 11 and the fiber bundle 14 and thereby prevent the flow of fluid through this space.

In operation, a fluid entering the inlet 13 under pressure will inflate the sleeve 20 and prevent the flow of fluid through the shell 11 except through the fiber bundle 14. Inasmuch, as there will be a drop in pressure along the length of the fiber bundle 14, the pressure at any point in the sleeve 20 will be slightly greater than the pressure in the fiber bundle at that same point. Thus, the sleeve 20 will remain fully inflated.

I claim:

1. A membrane separation module comprising:
   a. a cylindrical shell having an inlet end and an outlet end;
   b. a bundle of hollow fiber membranes positioned in and extending along the shell;
   c. an imperforate, flexible sleeve positioned in the shell and surrounding the bundle of fibers, said sleeve being retroflexed in such a manner that one end is in contact with the fiber bundle at said inlet end and the other end of the sleeve is in contact with the shell at said inlet end; and
   d. means for securing said one end of the flexible sleeve to said fiber bundle and for securing said other end of the sleeve to the shell at said inlet end to leave an intermediate portion of the sleeve free.

2. The module of claim 1 wherein the difference between the diameter of the bundle of fibers and the inner diameter of the shell is sufficiently great that the pressure of a fluid entering the inlet end of the shell at operating pressure is sufficient to extend said intermediate portion into position between the shell and the bundle of fibers.

3. The module of claim 1 wherein the sleeve is sufficiently long that said intermediate portion extends along a major portion of the length of the fiber bundle.

4. The module of claim 3 wherein the means for securing the other end of the sleeve to the shell comprises a ring attached to the inner surface of the shell with the other end of the sleeve secured therebetween.

5. A membrane separation module, comprising:
   a. a cylindrical shell having an enlarged fluid inlet end, the other end of the shell having a gas outlet;
   b. a tube sheet positioned in the enlarged inlet end of the shell;
   c. a bundle of hollow fiber membranes positioned in the shell and extending through the tube sheet;
   d. an inlet sleeve surrounding the bundle of fibers and having one end thereof secured to the tube sheet, said sleeve having therein openings to allow a fluid mixture in the enlarged end of the shell to flow into the fiber bundle.

e. an imperforate, flexible sleeve surrounding the fiber bundle and having one end thereof secured to the other end of the inlet sleeve, said flexible sleeve being retroflexed in such a manner that the other end of the sleeve is positioned in the enlarged inlet end of the shell; and f. means for securing said other end of the flexible sleeve to the inner surface of the shell to leave an intermediate portion of the flexible sleeve positioned between the shell and the fiber bundle.

6. The modules of claim 5 where said means for securing said other end is in the form of a ring, said ring being inside said sleeve, said ring and said shell holding said other end therebetween.

* * * * *